E. B. SELLARD.
GEARING FOR MOTOR DRIVEN PLOWS.
APPLICATION FILED JUNE 9, 1910.
1,030,686.
Patented June 25, 1912.
3 SHEETS—SHEET 1.
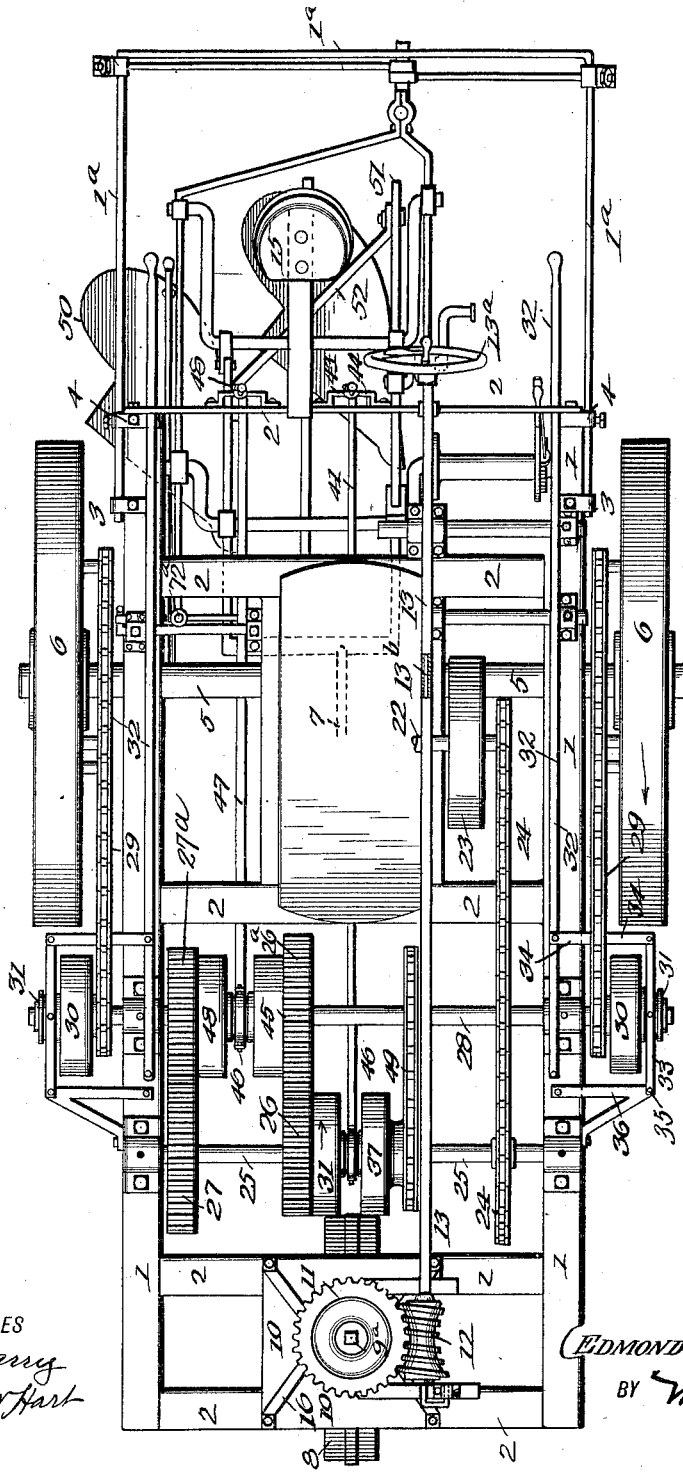
WITNESSES
F. C. Barry
Amos W. Hart
INVENTOR
Edmond B. Sellard
BY Munn & Co.
ATTORNEYS

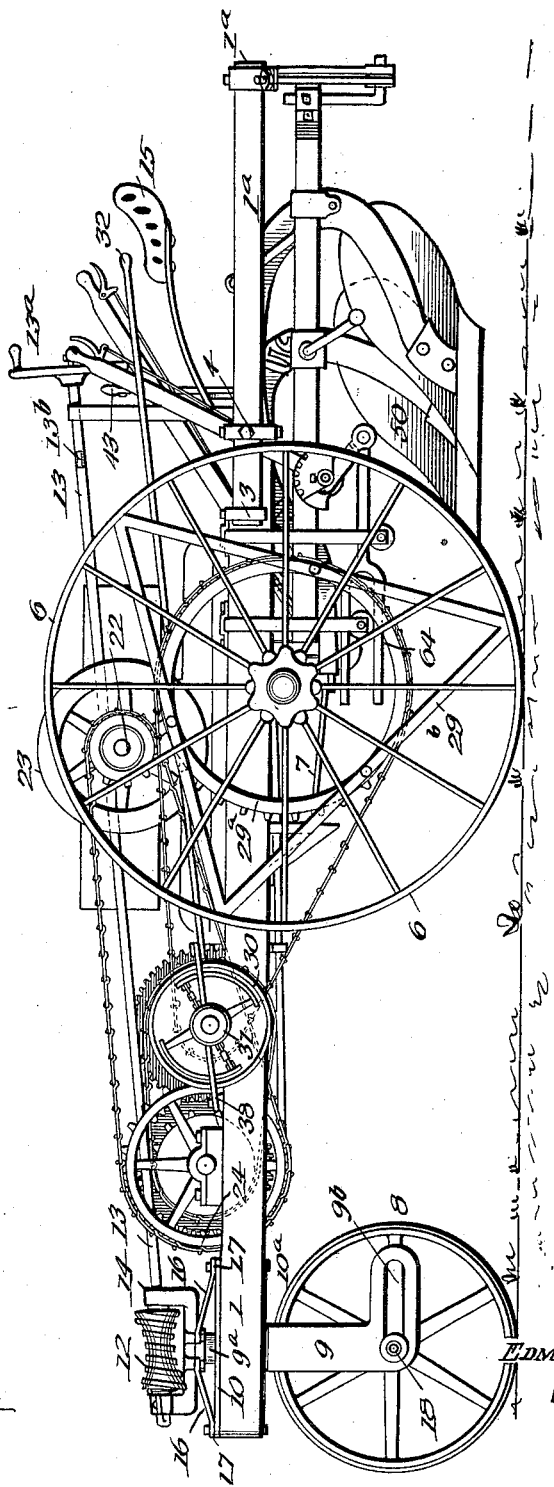

E. B. SELLARD.
GEARING FOR MOTOR DRIVEN PLOWS.
APPLICATION FILED JUNE 9, 1910.
1,030,686.
Patented June 25, 1912.
3 SHEETS—SHEET 3.
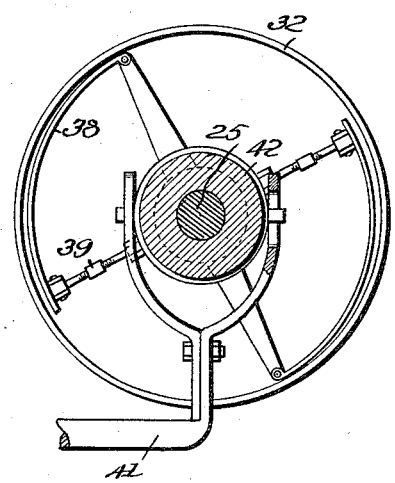
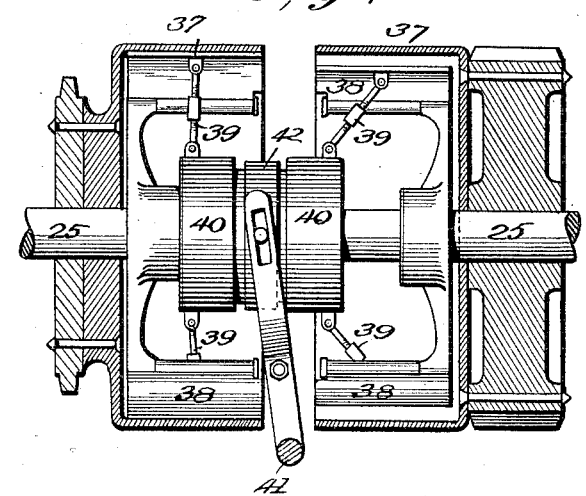
WITNESSES
INVENTOR
EDMOND B. SELLARD
BY
ATTORNEYS

UNITED STATES PATENT OFFICE.

EDMOND B. SELLARD, OF MEXICO, MISSOURI.

GEARING FOR MOTOR-DRIVEN PLOWS.

1,030,686. Specification of Letters Patent. Patented June 25, 1912.

Application filed June 9, 1910. Serial No. 565,925.

*To all whom it may concern:*

Be it known that I, EDMOND B. SELLARD, a citizen of the United States, residing at Mexico, in the county of Audrain and State of Missouri, have invented an Improvement in Gearing for Motor-Driven Plows, of which the following is a specification.

My invention is embodied in certain improved features of construction, arrangement, and combination of parts, as hereinafter described and illustrated in the accompanying drawings, in which—

Figure 1 is a plan view of a motor plow to which my invention is applied. Fig. 2 is a side elevation of the same. Figs. 3 and 4 are sectional views of clutch mechanism forming a part of the gearing.

Referring in the first instance to Fig. 1, the numeral 1 indicates the side bars and 2 the cross bars of the main frame of the machine. To this frame, a supplemental lighter and detachable rear frame $1^a$ is secured. The main frame 1 is supported upon an axle 5 having transporting wheels 6 mounted loosely thereon. These wheels are driven from an engine or motor 7 by means which will be presently described and thus serve to propel the machine. The frame is further supported by a third wheel 8, which as shown in Fig. 2, is located at the front of the main frame and journaled in a fork 9. The vertical fork 9 is shown journaled in bearings 10 secured to the front cross bars 2 of the main frame and is thus adapted to be turned for placing the guide wheel 8 at different inclinations as required for steering the machine. The means for turning the front wheel in this manner are a worm wheel 11 and worm 12 which meshes therewith. The worm wheel is keyed on the post or axis $9^a$ of the fork 9, and the worm 12 is keyed on a hollow shaft 13 having its front bearings in the head or casting 14 that is fixed in position. The said shaft is extended rearward and provided with a hand-wheel $13^a$ that is located adjacent to the driver's seat 15. By rotating the hand-wheel, the worm 12 will turn the worm wheel 11, and thus the front guide wheel 8 may be adjusted to any lateral inclination so as to guide the machine right or left. Thus, the machine may be guided by hand. It may, however, be guided by means of the wheel 6; that is to say, by locking one of the wheels with the driving mechanism and leaving the other loose, the machine may be turned in one direction or the other. When the machine is guided by hand, the axis 18 of the front guide wheel 8 is clamped by nuts at the forward end of the slot $9^b$ in the fork 9—see Fig. 2; but when it is desired to use the wheel 6 for turning, the axis 18 of said guide wheel is adjusted at the rear end of the slot $9^b$ in fork 9. It is, of course, necessary to throw the worm 12 out of mesh with the worm wheel 11 when the machine is to be guided by the drive wheel 6. For this purpose, a small shaft $13^b$ extends through the shaft 13 and is bent or curved at its forward end, as shown in Fig. 1, the curved end being confined in a boxing at $13^c$ as shown. A hand lever $13^d$ is applied to the rear end of the shaft $13^b$. In order to remove the worm 12 from mesh with the wheel 11, the two shafts 13 and $13^b$ are swung over laterally. The axis 18 of the guide wheel 8 is at the same time adjusted at the rear end of the slot $9^b$ as described.

The head or casting 14 shown in Fig. 2 is secured to a plate 10 by means of brace rods 16 and bolts 17. It will be understood that there is another plate $10^a$ secured to the under side of the front bars 2 of the frame and through these plates the axis or shaft $9^a$ of the fork 9 passes, as will be readily understood. There are four of the aforesaid braces 17, and these serve to hold the casting or head 14 rigidly connected with the bearing plates 10, through the medium of the bolts 17. Referring particularly to Fig. 2, it will be seen that the lower portion of the arms of fork 9 are extended horizontally rearward and parallel and provided with lengthwise slots $9^b$. In these slots, the axle 18 of the guide or steering wheel 8 is made adjustable as shown, the wheel hub is provided with a boxing 19 through which the said shaft 18 passes. Flanged bearing blocks 20 are applied to the respective ends of the shaft 18 and they project into the slots $9^b$. The axle 18 is provided with a head at one end and a nut at the other and washers 21 are arranged between such heads and nuts and the outer sides of the fork 9. It will be seen that by screwing up the nut on the axle, the latter may be clamped in different positions in the slots $9^b$ since the pressure of the washers 21 against the sides of the fork forces them inward against the flanges of the bearing blocks 20 and they are in turn forced against the bushing or boxing 19 of the wheel. While these parts may be clamped firmly together, the wheel is free to rotate on the box 19. By adjustment of the wheel axle forward or backward in the slots of the fork, the machine is adapted to describe circles of greater or less radius.

I will now describe the mechanism which operatively connects the motor 7 with the driving and transporting wheels 6, and which adapts the machine to be driven at greater or less speed. Referring to Fig. 1, the shaft 22 of the motor or engine is provided with a fly wheel 23 and is connected by sprocket gearing 24 with a counter shaft 25 arranged transversely in the front portion of the machine. The motor shaft 22 and counter shaft 25 are thus constantly driven while the machine is being operated. On the counter shaft 25 is mounted loose a pinion or small gear 26 and a larger gear 27 is keyed on the same shaft. These mesh respectively with a gear 26$^a$ and pinion 27$^a$ which are mounted loose on the supplemental drive shaft 28 that is arranged between and parallel to the motor shaft 22 and counter shaft 25. This shaft 28 is connected by sprocket gearing 29 with the driving and transporting wheels 6 and clutches 30 are applied to the ends of the shaft for the purpose of locking the latter with the sprocket gearing so as to rotate the wheel 6 when desired. The clutch may be of the friction order, the sliding hub 31 of the same being mounted on the end of the shaft 28 and operated by a lever 32 that extends backward in proximity to the driver's seat. Such lever is pivoted at its front end to the main frame and connected by a link 34 with a short lever 33 that is fulcrumed at 35 on a bracket 36 and is suitably connected intermediately of its ends with the clutch hub 31. It is apparent that the driver from his seat may shift the rear ends of the levers 32 inward or outward, that is to say, to the right or left and thus may throw the clutches in or out so as to connect the shaft 28 with the drive wheels or disconnect it therefrom as conditions may require. It is further apparent that by pulling one of the levers 32 inward the clutch on that side will be engaged while the clutch on the other side may be left free and thus the machine may be turned to the right or left as conditions require. Thus by disengaging the clutch 30 on the end of the supplemental shaft 28 toward which the operator wishes to turn the machine, the latter will immediately swing around toward the side on which the inactive drive wheel 6 is located, the guide wheel 8 in such case operating as a caster, that is to say, its slotted arm swinging on the central axis of the fork. It is obvious that this turning of the machine by means of the drive wheels, through operation of the clutches, would be impossible were it not for the fact that the guide wheel may be adjusted in the fork or may operate as a caster. The machine will thus turn practically in its own length.

On the counter shaft 25 there is placed a double clutch 37 which is illustrated in Figs. 3 and 4. The numeral 37 indicates the cylindrical shell of the clutches and 38 friction shoes arranged within the same and connected by adjustable links 39 with collars 40 which are loosely keyed on the shaft 25. By sliding the collars 40 one way or the other, it is obvious that one or the other of the clutches may be thrown into action, that is to say, locked with the shaft. For shifting these collars 40 right or left, I employ a lever 41 whose front end is forked and projects upward to adapt it for engagement with pins projecting from a loose collar 42 that is mounted on a drum connecting the two clutches to the two collars 40. This lever 41 extends rearward to a point near the driver's seat where it is connected with a vertical lever 43 that is adapted to swing laterally and provided with means for locking it with a fixed rack 44. Thus the driver by shifting the lever 43 one way or the other laterally, rotates the rod 41 so that by torsion, its front end shifts the clutches 40, with the result already stated. Between the gear 26$^a$ and pinion 27$^a$ on this supplemental drive shaft 28, there are applied two clutches that are connected with said gear and pinion respectively and between and within the clutch-drums or shells 45, there are arranged clutch collars 46, and a lever 47, which is similar to the lever 41, before described, is connected therewith and also with a hand lever 48 that is similar to the hand lever 43. Thus by shifting the lever 48, the lever 47 will be rotated and the clutch collars 46 shifted laterally correspondingly so as to engage either the gear 26$^a$ or pinion 27$^a$.

It will now be understood that if the operator shifts the collars 40 on the counter-shaft 25, toward the pinion 26, it will be locked with said shaft and will, therefore, drive the gear 26$^a$; and if the latter be in turn locked with the adjacent clutch by operating the lever 47, the shaft 28 will be driven at a comparatively low speed. Of course at this time, the driver will operate the levers 32 so as to throw in the clutches 30, 31 in order to operatively connect the supplemental drive shaft 28 with the wheels 6. Thus through the connection and operation of mechanism described, the machine may be driven forward at a comparatively low speed. On the other hand, if it be desired to drive the machine at a higher speed, the clutch collars 46 are shifted to engage the pinion 27$^a$ with the shaft 28 and thus the high speed will be attained through the medium of the gear 27 that meshes with the pinion 27$^a$. It will thus be understood that at any time high speed is desired it is only necessary to shift the clutch 45, 46 in such way as to engage the pinion 27ª, since the counter shaft 25 is constantly driven from the motor shaft 22 and the gear 27 is fast on the shaft 25 so that the pinion 27ª is always driven whether it be locked with the shaft 28 or not.

It is sometimes necessary to reverse the operation of the drive wheels 6 in order to run the machine backward and for this purpose the left hand clutch 37—see Fig. 1—is connected by a sprocket 49 with the supplemental drive shaft 28. Then, by shifting the clutch collars 40 toward the left the shafts 25 and 28 will be locked together and the latter will be rotated in a direction reverse to that in which it rotates when the pinions and gears are operated, as before described.

The sprocket gearing 29 which connects the drive wheels 6 with the supplemental drive shaft 28 consists as usual of a chain and a large and small sprocket gear. The larger gear 29ª—see Fig. 2—is not secured directly to a wheel 6, but to a triangular frame 29ᵇ which is bolted to the inner side of the wheel rim, as shown. This attachment combines maximum strength, rigidity and lightness, as well as being inexpensive.

What I claim is:—

The combination with the frame, axle, and wheels loose on the latter, of the motor shaft, the supplemental drive shaft (28) and counter-shaft (25), all arranged parallel, sprocket gearing connecting said motor shaft with counter-shaft and the latter with the supplemental drive-shaft, and said drive-shaft with the wheels, two gears mounted loose on the drive shaft and a slidable clutch arranged between said gears, a fast gear (27) and a loose gear (26) on countershaft which gears mesh respectively with the loose gears on the drive shaft, a sprocket mechanism operatively connecting the counter shaft with the drive shaft, and a slidable clutch on said counter-shaft for engaging the said sprocket mechanism or the adjacent loose gear, as described.

EDMOND B. SELLARD.

Witnesses:
MATTHIAS CRUM,
H. CLAY McCLURE.

---

Copies of this patent may be obtained for five cents each, by addressing the "Commissioner of Patents, Washington, D. C."